United States Patent
Freund et al.

(10) Patent No.: US 9,952,074 B2
(45) Date of Patent: Apr. 24, 2018

(54) HVAC SYSTEM WITH AUTOMATED FLOW DIRECTION DETECTION

(71) Applicant: Johnson Controls Technology Company, Plymouth, MI (US)

(72) Inventors: Mark G. Freund, Wauwatosa, WI (US); Troy A. Goldschmidt, Brown Deer, WI (US); Gary W. Gavin, Franklin, WI (US); Brandon A. Sloat, New Berlin, WI (US); Timothy C. Gamroth, Dousman, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/349,979

(22) Filed: Nov. 11, 2016

(65) Prior Publication Data
US 2017/0059373 A1    Mar. 2, 2017

Related U.S. Application Data

(63) Continuation of application No. 13/668,146, filed on Nov. 2, 2012, now Pat. No. 9,528,865.

(51) Int. Cl.
*G01F 1/34* (2006.01)
*F24F 11/04* (2006.01)
*F24F 11/00* (2018.01)

(52) U.S. Cl.
CPC ............... *G01F 1/34* (2013.01); *F24F 11/04* (2013.01); *F24F 2011/0042* (2013.01); *Y10T 137/7722* (2015.04)

(58) Field of Classification Search
None
See application file for complete search history.

(56) References Cited

U.S. PATENT DOCUMENTS

| | | |
|---|---|---|
| 5,008,803 A | 4/1991 | Iida |
| 5,377,112 A | 12/1994 | Brown et al. |
| 5,426,975 A | 6/1995 | Stark |
| 5,681,988 A | 10/1997 | Koch et al. |

(Continued)

FOREIGN PATENT DOCUMENTS

| | | |
|---|---|---|
| EP | 1 582 577 | 10/2005 |
| WO | WO-89/02581 | 3/1989 |

(Continued)

OTHER PUBLICATIONS http://www.merriam-webster.com/dictionary/gas, printed on Nov. 19, 2015, 1 page.

*Primary Examiner* — Tung Lau
(74) *Attorney, Agent, or Firm* — Foley & Lardner LLP

(57) ABSTRACT

A heating, ventilation, or air conditioning (HVAC) system with automated flow direction detection is provided. The HVAC system includes one or more hoses configured to provide airflow from HVAC equipment, a bidirectional pressure sensor coupled to the hoses, and a controller coupled to the bidirectional pressure sensor. The controller is configured to receive a signal from the bidirectional pressure sensor, determine a direction of the airflow relative to the bidirectional pressure sensor based on the signal, correct the signal for a reversed hose polarity relative to the bidirectional sensor based on the direction of the airflow, and perform a control activity using the corrected signal.

20 Claims, 5 Drawing Sheets

(56) References Cited

U.S. PATENT DOCUMENTS

| | | | | |
|---|---|---|---|---|
| 5,886,267 | A | * | 3/1999 | Ortiz .................. G01F 1/206 73/861.61 |
| 6,817,193 | B2 | | 11/2004 | Caesar et al. |
| 2012/0006040 | A1 | | 1/2012 | Kinoshita et al. |

FOREIGN PATENT DOCUMENTS

| | | |
|---|---|---|
| WO | WO-92/22791 | 12/1992 |
| WO | WO-2004/074188 | 9/2004 |

* cited by examiner

HVAC SYSTEM WITH AUTOMATED FLOW DIRECTION DETECTION

CROSS-REFERENCE TO RELATED PATENT APPLICATION

This application is a continuation of U.S. patent application Ser. No. 13/668,146 filed Nov. 2, 2012, the entire disclosure of which is incorporated by reference herein.

BACKGROUND

The present invention relates generally to the field of variable air volume (VAV) controllers for heating, ventilation, and air conditioning (HVAC) systems. The present invention more particularly relates to systems and methods of determining the direction of airflow across a pressure sensor in a VAV controller.

Velocity pressure is one description of air flow in a duct. Velocity pressure is the difference between the total (face) pressure and the static pressure. The static pressure and the face pressure can be measured. At least two hoses or tubes, corresponding to in-flow and out-flow, are attached to the ductwork. The hoses may be connected to a pressure sensor to measure the face pressure.

With a unidirectional or single-ended pressure sensor, face pressure can be measured in only one direction. Accordingly, the face pressure and the static pressure must be measured at the appropriate locations to accurately calculate velocity pressure. Face pressure is measured on the high side (in-flow), and static pressure is measured on the low side (out-flow). The hoses or tubes carrying the air must be connected to the correct side of the pressure sensor so that face pressure is measured on the high side. A bidirectional or bipolar pressure sensor can measure both negative pressure and positive pressure (i.e. air flow in both directions). Nevertheless, a technician may still be required to install the hoses on particular sides of the pressure sensor so that the actual direction of airflow is known.

Bidirectional pressure sensors can lead to confusion or mistakes among technicians in the field, resulting in incorrect (backwards) installations of the hoses to the pressure sensor. Manufacturers and consumers can incur costs relating to the incorrect installation. This includes monetary costs associated with equipment designed to alleviate confusion (e.g., differently colored tubes to designate the side they are to be installed on). This can also include the time required for manual verification of the direction in which the hoses were originally installed, time required for reinstallation of the hoses when they were originally installed backwards, down time during power cycling of the VAV controller, or down time associated with re-commissioning of the VAV controller.

Reducing or omitting manual verification of the hose installation and/or airflow direction is challenging and difficult.

SUMMARY

One embodiment of the invention relates to a computerized method for determining flow direction relative to a bidirectional pressure sensor. The method includes receiving pressure information from the bidirectional pressure sensor. The method includes using the pressure information to evaluate, at a processing circuit, pressure at the bidirectional pressure sensor over time, The method includes assigning a flow direction to a current pressure of the bidirectional pressure sensor by comparing the current pressure to at least one past pressure.

Another embodiment of the invention relates to a controller coupled to a bidirectional pressure sensor. The controller includes a processing circuit configured to receive at least one signal representative of a pressure measured by a bidirectional pressure sensor. The processing circuit is further configured to compare the at least one signal to a threshold. The threshold comprises a positive value and a negative value. The processing circuit is configured to determine a direction of flow based on the comparison and to output a pressure variable comprising a pressure magnitude and a sign based on the determined direction.

Yet another embodiment of the invention relates to tangible computer-readable storage media having computer-executable instructions embodied thereon that when executed by a computing system perform a method for determining flow direction relative to a bidirectional pressure sensor. The media includes instructions for receiving at least one signal representative of a pressure measured by a bidirectional pressure sensor. The media includes instructions for comparing the at least one signal to a threshold. The threshold comprises a positive value and a negative value. The media includes instructions for determining a direction of flow based on the comparison. The media includes instructions for outputting a pressure variable comprising a pressure magnitude and a sign based on the determined direction Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the figures, a system for use with a bidirectional pressure sensor is shown and described. The system is generally configured to automatically determine the direction of airflow. The direction of airflow may be expressed as a polarity of the pressure value that is measured by the bidirectional sensor. That is, a positive pressure or a negative pressure may be indicative of airflow in different directions. A dynamic threshold may be used to determine if and when the polarity (and the direction of air flow has changed). The system may be implemented in a controller local to the variable air volume (VAV) box (e.g., a variable air volume modular assembly (VMA)) or implemented in an upstream building automation system controller (e.g., a building management computer such as the Johnson Controls METASYS Network Automation Engine, etc.).

One or more embodiments of the present disclosure may advantageously allow installation of air flow tubes at a VAV controller without regard to the direction of air flow. One or more embodiments may automatically (i.e., dynamically) determine the direction of airflow in different orientations of the air flow tubes. One or more embodiments may advantageously reduce the need for human or manual confirmation of the air flow direction relative to a bidirectional sensor.

Figure 1:
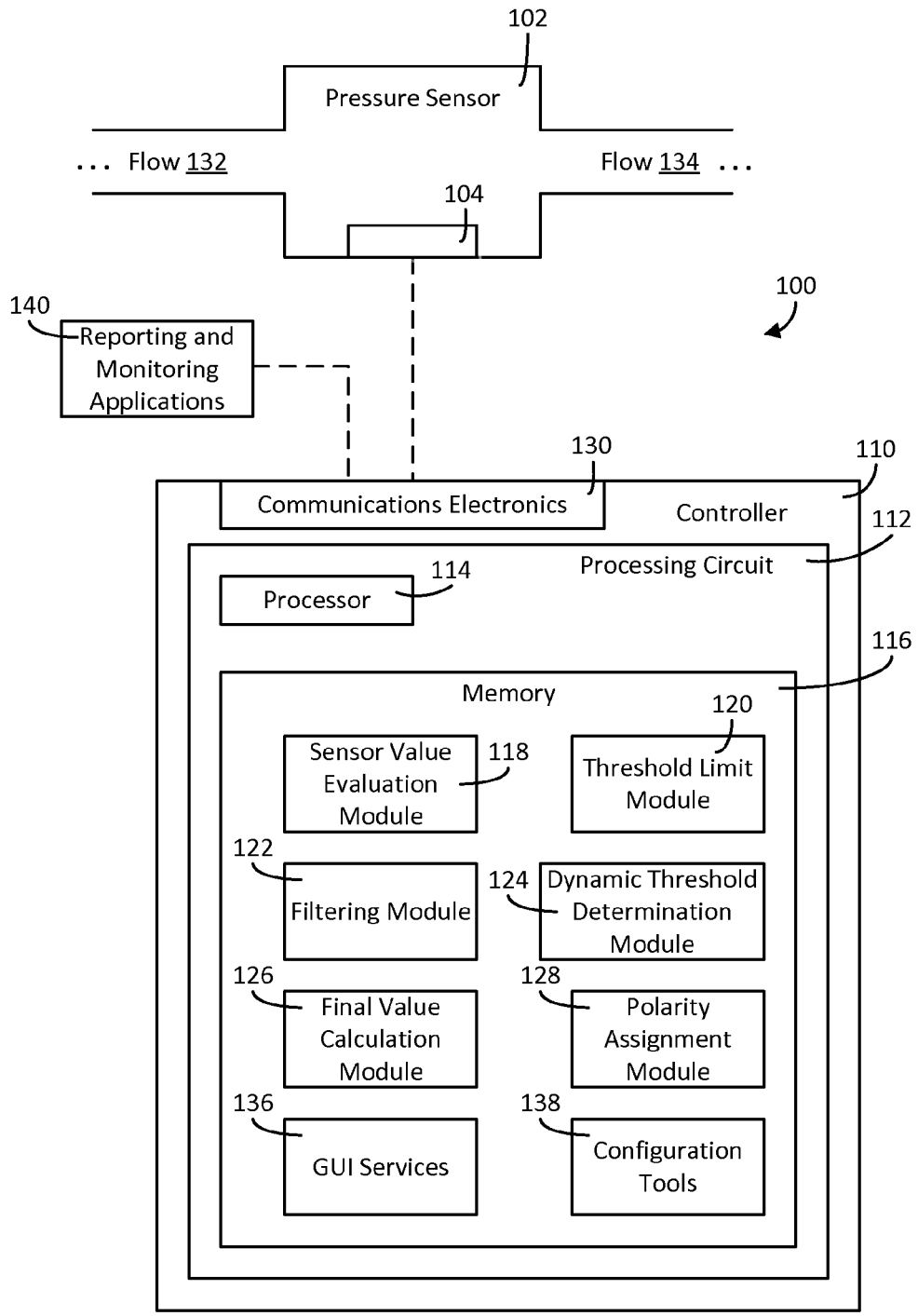
FIG. 1 is a block diagram of a system for determining flow direction using a bidirectional sensor, according to an exemplary embodiment.

Referring to FIG. 1, a block diagram of system 100 for determining flow direction is shown, according to an exemplary embodiment. System 100 includes pressure sensor 102. According to an exemplary embodiment, pressure sensor 102 is a bidirectional (i.e., bipolar) pressure sensor. That is, the sensor can measure both positive and negative velocity pressure. Velocity pressure may be positive or negative depending on the direction of air flow across the sensor. In some embodiments, pressure sensor 102 may be part of a VAV modular assembly. The modular assembly, for example, may be an all-in-one-assembly including a pressure sensor, actuator and controller. In other embodiments, the pressure sensor may be a stand-alone device.

In the embodiment of FIG. 1, pressure sensor 102 is shown to include communications electronics 104 (e.g., a wire terminal, a data communication port, a wireless transmitter, etc.). The signals (e.g., voltage signals varying in amplitude to represent pressure) generated by pressure sensor 102 may be transmitted to controller 110 via communications electronics 104. In some embodiments, pressure sensor 102 may include processing electronics to convert the voltage signals to digital pressure values. In such embodiments, the digital pressure values may be transmitted to controller 110 via communications electronics 104.

In the embodiment of FIG. 1, system 100 is shown to include only one pressure sensor 201. In various embodiments, multiple pressure sensors 102 (e.g., corresponding to multiple VAV controllers) may be implemented with one or more controllers 110. As used in the discussion herein, pressure generally refers to the face pressure at the pressure sensor 102 or the velocity pressure (the difference of the face pressure and the static pressure).

FIG. 1 illustrates flows 132, 134. Flows 132, 134 may correspond with two or more hoses or tubes connected to pressure sensor 102. According to an exemplary embodiment, flows 132, 134 represent airflows in a HVAC system. Flow 132 may be an in-flow and flow 134 may be an out-flow, or vice versa. The systems and methods described herein are configured to determine the direction of the flows 132, 134. Advantageously, the systems and methods described herein can dynamically or automatically determine the flow direction and use such flow direction in subsequent control activities or calculations. In various embodiments, controller 110 may receive signals representative of pressure measurements from pressure sensor 102 both when there is an active flow and when there is no active flow.

System 100 includes controller 110. Controller 110 may be configured to cause the steps of the processes described herein (e.g., FIGS. 2-4) to be completed. Controller 110 may use pressure to control one or more processes (e.g., HVAC processes, manufacturing processes, industrial processes, etc.). Controller 110 may be configured to evaluate pressure over time and to determine flow direction based on current pressure relative to past pressure. Controller 110 may be configured to determine flow direction based on pressure values both when there is active flow and when there is no active flow. According to an exemplary embodiment, controller 110 is integrated within a single computer (e.g., one server, one housing, etc.). In various other exemplary embodiments, controller 110 can be distributed across multiple servers or computers (e.g., that can exist in distributed locations). In such embodiments, for example, a first step may be completed by circuitry local to the sensor while one or more subsequent steps are conducted by circuitry of a field controller. In another exemplary embodiment, controller 110 may be integrated with a smart building manager that manages multiple building systems.

Controller 110 is shown to include processing circuit 112. Processing circuit 112 receives and processes signals from pressure sensor 102. Signals received from pressure sensor 102 may undergo one or more filtering processes. Processing circuit 112 may be configured to determine a dynamic threshold based on the past and current pressure values. The dynamic threshold may automatically adapt (e.g., increase and decrease) based on pressure values. Processing circuit 112 may be configured to compare a current pressure to the dynamic threshold to determine the polarity of the air flow.

Processing circuit 112 includes processor 114 and memory 116. Processor 114 can be implemented as a microprocessor, general purpose processor, an application specific integrated circuit (ASIC), one or more field programmable gate arrays (FPGAs), a group of processing components, or other suitable electronic processing components. Memory 116 is one or more devices (e.g., RAM, ROM, Flash memory, hard disk storage, etc.) for storing data and/or computer code for completing and/or facilitating the various processes and modules described in the present disclosure. Memory 116 may be or include volatile memory or non-volatile memory. Memory 116 may include database components, object code components, script components, or any other type of information structure for supporting the various activities and information structures described in the present disclosure. According to an exemplary embodiment, memory 116 is communicably connected to processor 114 via processing circuit 112 and includes computer code for executing (e.g., by processing circuit 112 and/or processor 114) one or more processes described herein. Memory 116 can also be used to store values discussed as used by the controller 110. For example, memory 116 can store historical pressure values, current pressure values, a current flow direction determination, historical flow direction determinations, or any other final, supporting, or intermediate data used by the systems and methods described herein.

While memory 116 is shown in FIG. 1 as part of a controller 110 and distinct from pressure sensor 102, the logic represented by the modules of controller 110 may be implemented on one or more devices communicably coupled to pressure sensor 102. For example, the logic may be implemented in circuitry of or local to the pressure sensor itself.

Memory 116 includes filtering module 122. Filtering module 122 includes instructions to reduce the noise in the signals received from pressure sensor 102. Signal noise may arise from many factors, including mechanical limitations of the pressure sensor and its components. Noise may also arise from dynamics of the fluid being measured, such as backflow of air in the HVAC system. One or more filtering processes may be implemented on the incoming signals. According to an exemplary embodiment, the filtering processes include a Butterworth filter and a Bessel filter. In various embodiments, different methods of reducing signal noise may be implemented. In some embodiments, in addition to or in lieu of the one or more filtering processes, signal averaging or other smoothing may be implemented.

Memory 116 includes sensor value evaluation module 118. In some embodiments, module 118 includes instructions for receiving a signal generated by pressure sensor 102 and processing the signal. The processing may result in the output of a raw pressure. In other embodiments, e.g., when the pressure sensor 102 includes processing electronics to convert the sensor voltage to pressure, sensor value evaluation module 118 may receive pressure values from pressure sensor 102. Sensor value evaluation module 118 may attach a time stamp to the received data to organize the data by time. When multiple pressure sensors 102 are coupled to controller 110, module 118 may assign an identifier to the data to organize the data by, e.g., VAV controller, zone, building, etc. In some embodiments, continuous data may be received from the pressure sensor 102. In other embodiments, pressure sensor 102 may transmit data periodically (e.g., every three seconds) to controller 110.

According to an exemplary embodiment, e.g., with a bidirectional or bipolar pressure sensor, pressure values may be signed positive or negative. Pressure values of opposite sign may be indicative of opposite flow directions. After the HVAC system, pressure sensor, and/or controller has initialized or come online, the pressure values generally remain either positive or negative, though the magnitude will vary. In some circumstances, the pressure values may also switch sign. This may occur, for example, if the hoses are changed to an opposite configuration (i.e., when the direction of the airflow changes). The sign of the pressure values after the configuration has changed may be opposite compared to the sign of the pressure values with the hoses in the earlier configuration. Controller 102 may advantageously determine when the flow direction has changed without requiring human input as to the correct flow direction or notification of the change.

Memory 112 includes polarity assignment module 128. Module 128 may include instructions for assign a polarity to a pressure value. According to an exemplary embodiment, module 128 may assign either a positive (+1) or negative (−1) polarity. Polarity may also be described as a multiplier. Module 128 may advantageously ensure that the final calculated pressure is correctly indicated (positive pressure corresponds with a first flow direction and negative pressure corresponds with a second flow direction, etc.). According to an exemplary embodiment, the final calculation is the product of the pressure value received from sensor 102 and the polarity (e.g., 1, −1). The product of a positive pressure value and positive polarity is positive. The product of a negative pressure value and negative polarity is also positive.

Memory 112 includes dynamic threshold determination module 124. Module 124 includes instructions for placing a threshold band around the received pressure values. The threshold band describes a range of recent pressure values. According to an exemplary embodiment, the band is centered around zero pressure and includes a positive and negative threshold of equal magnitude (but opposite sign). An example of the positive threshold 506 and negative threshold 508 (together forming the threshold band) is shown in FIG. 5B.

In some embodiments, the band may be fixed. Thus, for example, when pressure values exceed the band in a positive direction, then controller 110 may determine that the flow is in the positive direction. If the pressure values later exceed the band in the negative direction, the controller 110 may determine that the flow has switched directions and the flow is in a negative direction.

In some embodiments, the band is dynamic or adaptive. The controller 110 may cause the band to adjust (e.g., increase or decrease in magnitude) based on current pressure values. Generally, when the pressure values increase, the band increases. That is, the magnitude of the positive and negative thresholds increase. This may be described as a threshold expansion phase. Generally, when the pressure values decrease, the positive and negative thresholds decrease. This may be described as a threshold collapse phase. According to an exemplary embodiment, the magnitude of the dynamic threshold is greater than or equal to the immediate past pressure value(s). According to another exemplary embodiment, initial conditions when the HVAC system, power controller 110, and/or pressure sensor 102 may include initializing the dynamic threshold to zero or near zero.

Controller 110 may be configured to reassign polarity (i.e., direction of air flow) when a criterion is satisfied. According to an exemplary embodiment, controller 110 reassigns polarity when the magnitude of a current pressure value exceeds or equals the dynamic threshold in the direction opposite the immediate or recent past pressure value(s). This advantageously helps ensure that controller 110 is not susceptible to incorrectly determining flow direction based on noise or other transient conditions (e.g., a reverse in air pressure due to a temporary system error or a temporary environmental or weather condition).

In one example, a current dynamic threshold may be ±0.02 inches w.c. The dynamic threshold may be based on the immediate (i.e., recent) past pressure value(s). That is, the immediate past pressure value(s) have been greater than or equal to −0.02 inches w.c. As described in discussion of FIG. 4, controller 110 may have determined that the flow is in a negative direction, based on the recent past pressure values that are greater than or equal to −0.02 inches w.c. Controller 110 may have assigned a negative (−1) polarity such that the product of the negative pressure value and negative polarity is positive. In order for controller 110 to determine that the flow has become positive (and reassign polarity), the pressure value received must be greater than or equal to +0.02 inches w.c. That is, the magnitude of a current pressure value exceeds or equals the band in the opposite direction. When the current pressure value does exceed or equal +0.02 inches w.c., controller 110 assigns a +1 polarity. The final calculated pressure would be positive because the product of the positive pressure value and positive polarity is positive.

Controller 110 may be configured to reassign polarity in a similar manner when recent past pressure values are positive. As in the example, above, a dynamic threshold may be ±0.02 inches w.c. The recent past pressure values may have been less than or equal to +0.02 inches w.c. Controller 110 may have assigned a positive (+1) polarity such that the product of the positive pressure value and positive polarity is positive. In order for controller 110 to determine that the flow has become negative, the pressure value received must be less than or equal to −0.02 inches w.c. That is, the magnitude of a current pressure value exceeds or equals the band in the opposite direction. The final calculated pressure would be positive because the product of the negative pressure value and negative polarity is positive.

Controller 110 advantageously utilizes both magnitude and sign of the pressure value to determine if the direction of air flow has changed. Controller 110 also advantageously utilizes a dynamic or adaptive threshold. As a VAV controller comes online, more air flows to the pressure sensor, the band is caused to expand outwards and the VAV controller starts working. For example, controller 110 may determine airflow is in a positive direction based on positive pressure values received from pressure sensor 102. Controller 110 may continue receiving signals indicative of airflow in the positive direction with greater magnitude. This enables a user, e.g., an HVAC engineer, to be confident in controller 110's determination that the airflow is in the positive direction and that the assigned positive (+1) polarity is correct. If the airflow changes to the opposite direction (e.g., pressure values become negative) and the controller 110 receives signals indicative of increasing negative flow, then controller 110 may determine that the direction of airflow is now negative. Thus, the polarity may be changed to negative (−1). In other words, the system may switch flow directions (switch polarity) when both the sign of the current pressure value has changed and when the current magnitude of the pressure exceeds immediate past pressure magnitude.

According to an exemplary embodiment, the dynamic threshold is greater than or equal to immediate past maximum pressure value(s) received from pressure sensor 102. As the pressure increases, the band also increases. According to an exemplary embodiment, when the pressure decreases to less than 50% of the immediate past pressure value, the band decreases to twice the current pressure value. Thus, if the current pressure decreases, but is between 50% and 100% of the current flow, the band does not decrease. In other embodiments, different percentage thresholds may be utilized. According to an exemplary embodiment, if the pressure is trending downward, the band may be at least twice the current flow. If the pressure then increases, the band may not increase until the pressure exceeds the magnitude of the band. Thus, in this exemplary embodiment, the adaptive threshold utilizes two mechanisms: (1) the band increases for each maximum pressure value seen; and (2) the band decreases to twice the current pressure value during when pressure is decreasing. Controller 110 advantageously utilizes hysteresis to determine when flow direction has changed. For example, past pressure values have led to a determination that flow is positive. In an exemplary embodiment, controller 110 advantageously makes determination of a direction change possible, but only when the determination is based on appropriate pressure data (e.g., sign change and sufficient magnitude).

Controller 110 can advantageously determine flow direction regardless of the size of a VAV controller. The adaptive threshold adjusts to the pressure values of the particular VAV controller. Controller 110 also advantageously accounts for building and HVAC system changes. Air flow may vary based on whether the HVAC system is heating or cooling, whether the building space is occupied or unoccupied, whether the HVAC system is shut down during a period of the day (e.g., during the night) and brought online during others (e.g., during the day), or whether or not the configuration of the air tubes connected to the VAV controller have been changed. The adaptive threshold accounts for such system changes.

Memory 116 includes threshold limit module 120. Module 120 includes instructions to prohibit the dynamic threshold from exceeding a particular maximum magnitude. In some embodiments, a user may input a threshold limit. In other embodiments, the threshold limit may be calculated based on a history of past pressure values. In yet other embodiments, the threshold limit is associated with a particular model or type of sensor or application. The threshold limit advantageously avoids a noise event or pressure spike from improperly affecting the threshold for many future periods of time. According to an exemplary embodiment, initial conditions when the HVAC system, power controller 110, and/or pressure sensor 102 initialize may include setting a 0.15 inches w.c. threshold limit.

Memory 116 includes final value calculation module 126. Module 126 includes instructions for calculating the pressure based on the current pressure value and the current polarity determination. According to an exemplary embodiment, the calculation is:

$$\text{final\_value} = \text{pressure\_value} * \text{Polarity}$$

Polarity may be a value determined based on the instructions in polarity assignment module 128. In other embodiments, different calculations may be used. Final_value may then be normally positive in a positive pressure scenario, advantageously enabling a positive pressure value to correspond with positive pressure. The calculation is "final" in the sense that it is done after the polarity has been determined. The "final_value" may be stored in memory for access by other devices, communicated via communications electronics, or otherwise output by the controller.

Controller 110 is shown to include configuration tools 138. Configuration tools 138 can allow a user to define (e.g., via graphical user interface controls (GUI), via prompt-driven "wizards," etc.) how the controller 110 should react to changing conditions in the building and/or HVAC system. Configuration tools 138 may also allow user to input initial conditions to implement when the HVAC system, power controller 110, and/or pressure sensor 102 initialize. It should be noted that for some devices "initialize" may mean that some or all of the device's components were previously powered on but not actively working. Once initialized, the device may be powered on and actively functioning. Initialize may also mean that the device is powered on when the device was previously completely or nearly completely powered down.

In an exemplary embodiment, configuration tools 138 allow a user to build and store condition-response scenarios that can cross multiple HVAC systems, multiple building systems, and multiple enterprise control applications (e.g., work order management system applications, entity resource planning applications, etc.). For example, the configuration tools 138 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). The configuration tools 124 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Data and processing results from modules 118, 120, 122, 124, 126, 128 or other data stored or modules of controller 110 may be accessed by or may be pushed to monitoring and reporting applications 140. This may allow real time control or "system health" dashboards to be viewed and navigated by a user (e.g., a HVAC engineer). For example, monitoring and reporting applications 140 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative pressure in VAV controllers in different buildings (real or modeled), different campuses, or the like. Other GUI elements or reports may be generated and shown based on available data that allow users to assess performance across one or more HVAC systems from one screen. The user interface or report (or underlying data engine) may be configured to aggregate and categorize operating conditions by building, building type, equipment type, and the like. The GUI elements may include charts or histograms that allow the user to visually analyze the operating parameters and pressure of one or more VAV controllers. Further, in some embodiments, applications and GUI engines may be included outside of controller 110 (e.g., as part of a smart building manager). Controller 110 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Controller 110 may be configured to provide the results of any such processing to other databases, tables, XML, files, or other data structures for further querying, calculation, or access by, for example, external monitoring and reporting applications. GUI services 136 may support such applications.

Controller 110 may include one or more GUI servers, services, or engine 136 (e.g., a web service). GUI services 136 may be configured to generate graphical user interfaces for a controller or another server to provide to a user output device (e.g., a display, a mobile phone, a client computer, etc.). The graphical user interfaces may present or explain current and past pressure, dynamic threshold, determined polarity, and/or other system information. GUI services 136 may facilitate a user's (e.g., HVAC engineer's) ability to track pressure and the determined flow direction via, e.g., a web-based monitoring application. GUI services 136 may additionally allow a user to manually set and update initial conditions, system constraints, certain thresholds, refresh rates, number of samples to use in a past window, how quickly to adjust thresholds, etc.

Controller 110 includes communications electronics 130. Pressure sensor 102 also includes communications electronics 104. In some embodiments, e.g., when pressure sensor 102 is part of a VAV controller, communications electronics 104 may be implemented as part of the VAV controller. Communications electronics 104, 130 may be or include any number of wire terminals, ports, or network interfaces. The processing circuit may be configured to communicate with one or more BAS components via a network connection. An analog voltage signal and/or pressure value may be received at controller 110 from pressure sensor 102.

Communications electronics 104 and/or 130 may include one or more filters, analog to digital converters, buffers, power lines, or other supporting circuitry. Communications electronics 104, 130 can also be or include wired or wireless interfaces (e.g., jacks, antennas, transmitters, receivers, transceivers, wire terminals, etc.) for conducting digital data communications. For example, communications electronics 104, 130 can include an Ethernet card and port for sending and receiving data via an Ethernet-based communications network. In another example, communications electronics 104, 130 includes a ZigBee or WiFi transceiver for communicating via a wireless communications network. Communications electronics 104, 130 may be configured to communicate via local area networks or wide area networks (e.g., the Internet, a building WAN, etc.).

Figure 2:
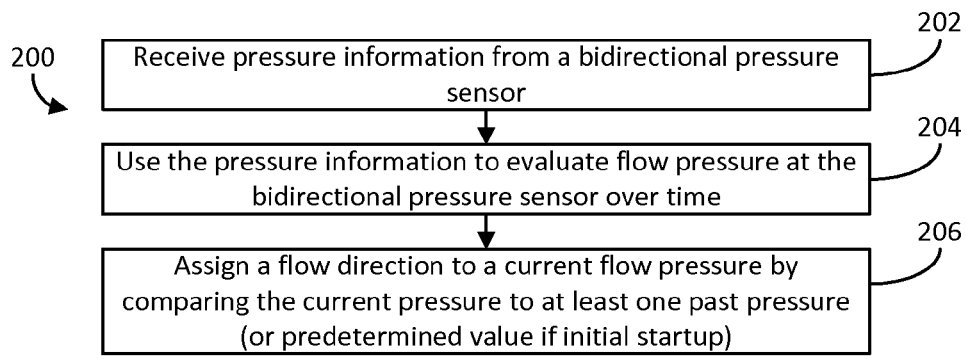
FIG. 2 is a flow diagram of a process for determining flow direction using a bidirectional sensor, according to an exemplary embodiment.

Referring to FIG. 2, a flow diagram of a process 200 for determining flow direction at a bidirectional sensor is shown, according to an exemplary embodiment. Process 200 may be implemented on, e.g., controller 110 (FIG. 1). Process 200 may be a high level representation of a process described in more detail in FIGS. 3 and 4.

Process 200 includes receiving pressure information from bidirectional pressure sensor (202). The pressure information may be representative of instantaneous pressure or pressure over time. In some embodiments, the pressure information includes voltage signals generated by a pressure sensor in response to measuring pressure. In other embodiments, the pressure information includes digital pressure values of the measured pressure. In some embodiments, the pressure information may be received continuously or nearly continuously. In other embodiments, the pressure information may be received at periodic intervals (e.g., every three seconds).

Process 200 includes using the pressure information to evaluate pressure at the bidirectional pressure sensor over time (204). The pressure information may be evaluated to determine whether the pressure values are positive or negative. The pressure information may be used to generate a dynamic threshold. The dynamic threshold may include a positive and negative component (e.g., a positive value and a negative value). The dynamic threshold may increase or decrease depending on the pressure information over time. For example, the dynamic threshold may increase when pressure information indicates pressure is increasing in magnitude. In some embodiments, the dynamic threshold may increase by a first proportion when the pressures increase by a second proportion. In some embodiments the first and second proportions may be equal, while in other embodiments, they are different. Similarly, the dynamic threshold may decrease by a first proportion when the pressure information indicates pressure is decreasing by a second proportion. In some embodiments, the first and second proportions are equal. For example, the first and second proportions may be one-half.

Process 200 includes assigning a flow direction to a current pressure by comparing the current pressure to at least one past pressure. According to an exemplary embodiment, the at least one past pressure is used to generate the dynamic threshold. The current pressure may be compared to the dynamic threshold (i.e., the at least one past pressure). In some embodiments, the dynamic threshold may have a predetermined value (e.g., zero) when the HVAC system, controller, and/or pressure sensor is initialized. In such embodiments, the current pressure may be compared to the predetermined value in the initial case. In some embodiments, a first direction may be assigned to pressure when the current pressure is greater than or equal to a maximum of the dynamic threshold. A second direction may be assigned to pressure when the current pressure is less than or equal to a minimum of the dynamic threshold. The maximum and minimum may be the current values of the dynamic threshold. The dynamic threshold may include a positive and negative value. According to another exemplary embodiment, assigning a flow direction includes determining a positive or negative multiplier.

Figure 3:
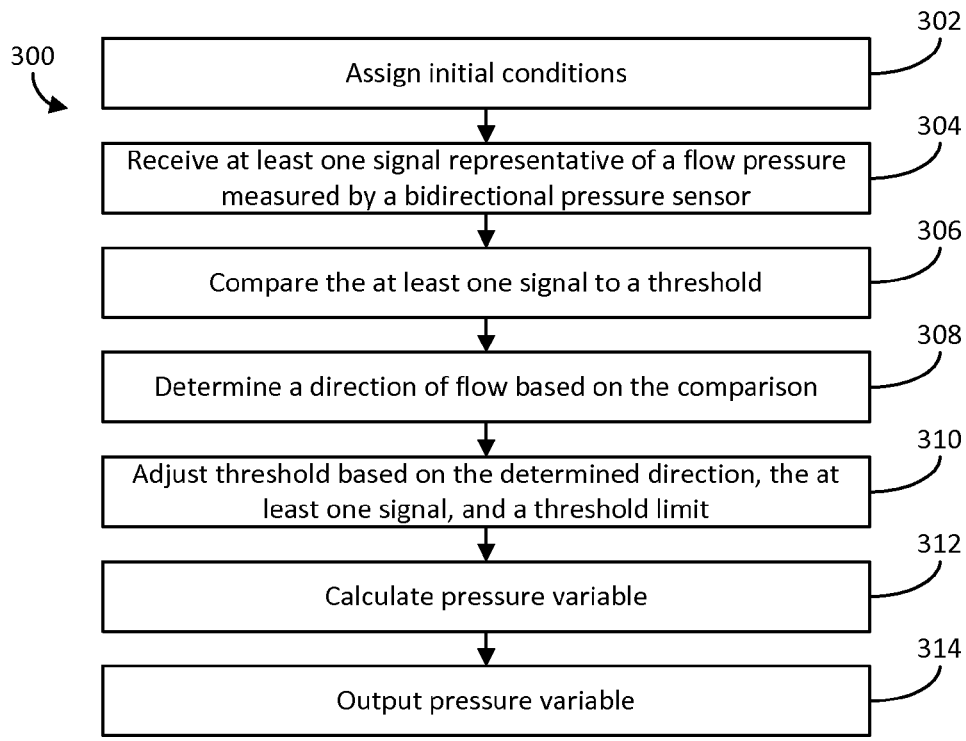
FIG. 3 is a more detailed flow diagram of the process for determining flow direction of FIG. 2, according to an exemplary embodiment.

Referring to FIG. 3, a flow diagram of a process 300 for determining flow direction relative to a bidirectional sensor is shown, according to an exemplary embodiment. Process 300 may be implemented on, e.g., controller 110 (FIG. 1). Process 300 may be a mid-level representation of a process described in more detail in FIG. 4.

Process 300 includes assigning initial conditions (302). Initial conditions may be assigned when the HVAC system, controller 110, and/or pressure sensor 102 are initialized. Initial conditions may include a value or values of the dynamic threshold, initial polarity, final pressure value, threshold limit, or other variables that may support the process. Some initial conditions may change automatically (e.g., based on signals received from the pressure sensor). Some initial conditions may be fixed or semi-fixed, requiring user intervention to change the condition. According to an exemplary embodiment, the initial conditions include dynamic_threshold=0, setting the value of the positive and negative components of the threshold to zero. The dynamic threshold will change depending on the signals received from the pressure sensor over time. The initial conditions may further include Polarity=1. According to an exemplary embodiment, polarity may be positive (e.g., +1) or negative (e.g., −1), and the initial conditions assume one or the other. The polarity may change depending on the signals received from the pressure sensor over time. The initial conditions may further include final_value=0. According to an exemplary embodiment, the final value is the product of the current pressure value and the determined polarity. The final value may change depending on the signals received from the pressure sensor over time. The initial conditions may include threshold_limit=0.15. The threshold limit may describe a maximum magnitude for the dynamic threshold in the positive and negative directions. In some embodiments, the threshold limit may be set by a user and may be later changed by a user.

Process 300 includes receiving at least one signal representative of a pressure measured by a bidirectional pressure sensor (304). The signal may be representative of a positive or negative pressure value. A positive pressure value may indicate flow in one direction, and the negative pressure value may indicate flow in another direction. A continuous signal or multiple discrete signals may be received over time.

Process 300 includes comparing the at least one signal to a threshold (306). The current pressure value indicated by the at least one signal compared to a maximum and a minimum of the threshold. In some embodiments, the current pressure value may also be compared to a threshold limit.

Process 300 includes determining a direction of flow based on the comparison (308). Determining the direction may include assigning a polarity or multiplier. According to an exemplary embodiment, the polarity or multiplier may be positive or negative. In some embodiments, flow may be determined to be in a first direction (e.g., resulting in polarity=1) when the current pressure value is greater than or equal to a maximum of the dynamic threshold. Flow may be determined to be in a second direction (e.g., resulting in polarity=−1) when the current pressure value is less than or equal to a minimum of the dynamic threshold.

Process 300 includes adjusting the threshold based on the determined direction, the at least one signal, and a threshold limit (310). The threshold may increase or decrease depending on the signals received over time. Thus, the threshold changes may include threshold expansion and threshold collapse. A threshold may expand when the magnitude of the current pressure is greater than the magnitude of the current threshold. The threshold may collapse by a first proportion (e.g., the threshold may decrease by 25%) when the magnitude of the current pressure is less than the magnitude of the current threshold by a second proportion (e.g., when the current is less than 50% of the threshold). The magnitude of the threshold may be changed to the threshold limit when the magnitude of the pressure value is greater than or equal to the threshold limit.

Process 300 includes calculating a pressure variable (312). The pressure variable may be described as a final pressure value. According to an exemplary embodiment, the pressure variable is the product of the current pressure and the determined polarity. According to another exemplary embodiment, the calculated pressure variable is positive.

Process 300 includes outputting the pressure variable 314. The pressure variable may be output to at least one memory device, a user device, and/or another device on the building management system. The output may be a graphical user interface (e.g., on a client device, on a mobile device, generated by a web server, etc.). According to an exemplary embodiment, the positive pressure variable may be used, by a building management system component, to compute another value.

Figure 4:
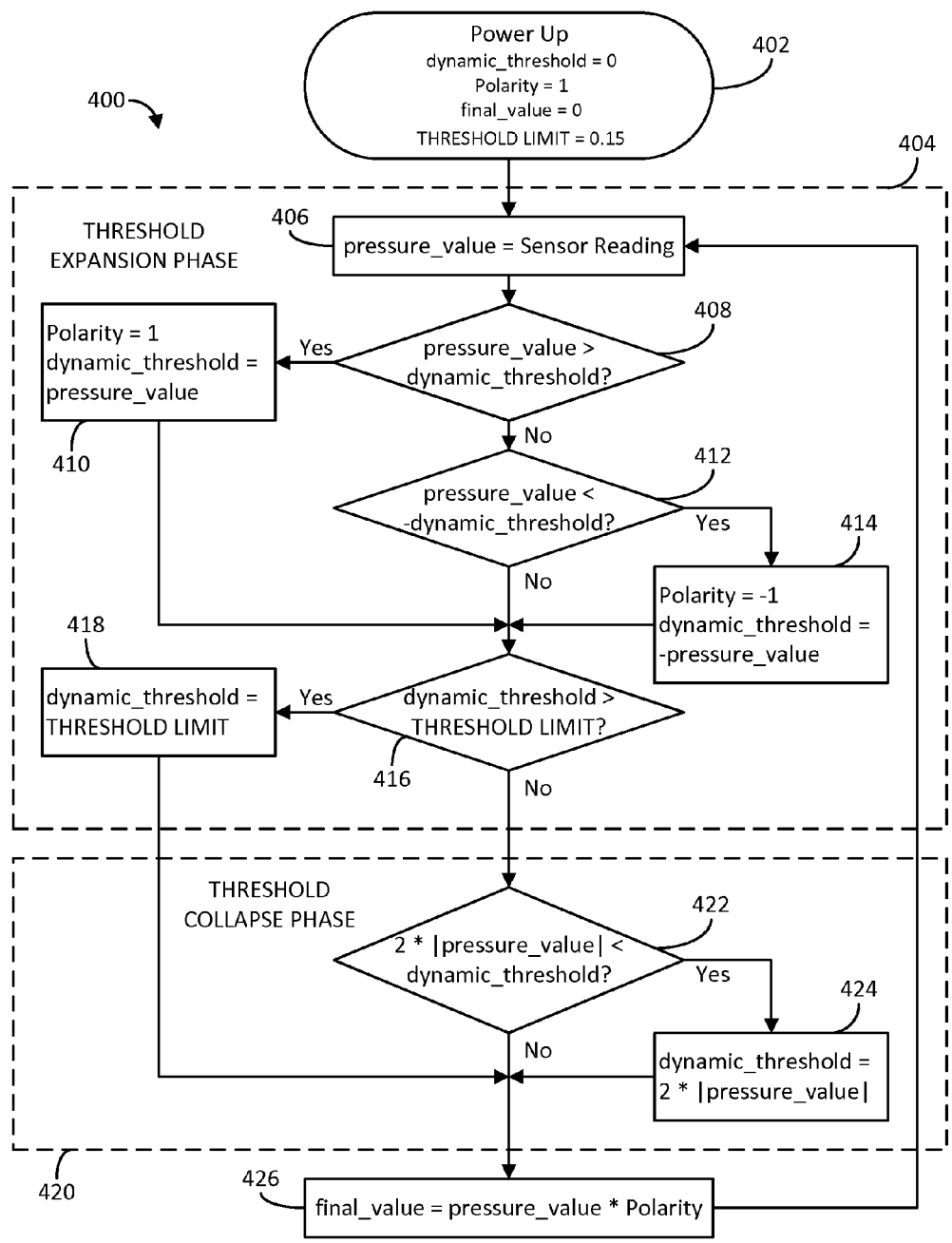
FIG. 4 is a more detailed flow diagram of the process for determining flow direction of FIG. 3, according to an exemplary embodiment.

Referring to FIG. 4, flow diagram of a process 400 for determining flow direction relative to a bidirectional sensor is shown, according to an exemplary embodiment. Process 400 may be implemented on, e.g., controller 110 (FIG. 1). Process 400 may be a detailed representation of a process described in FIGS. 2 and 3.

Process 400 includes initializing the HVAC system, controller 110, and/or pressure sensor 102 (402). During initialization, one or more initial conditions may be set. The initial conditions may include dynamic_threshold=0, Polarity=1, final_value=0, and threshold limit=0.15. In other embodiments, more or fewer initial conditions may be assigned and/or different values may be assigned.

Process 400 includes determining the current pressure value (406). According to an exemplary embodiment, the current pressure value is equal to the sensor reading. In some embodiments, the pressure value may be equal to the sensor reading and an offset. Steps 406-418 may be considered as a threshold expansion phase. That is, steps 406-418 determine whether a current pressure value is greater in magnitude than the past pressure values (e.g., reflected in the dynamic threshold) and adjust (increase) the dynamic threshold accordingly. Process 400 includes determining if the current pressure value is greater than the positive component of the dynamic threshold (408). This determines if flow is in a positive direction. If so, positive polarity/multiplier (+1) may be assigned (410). The magnitude of the dynamic threshold may also be increased to the magnitude of the pressure value. That is, both the positive component and the negative component of the dynamic threshold may be increased to the magnitude of the pressure value. Process 400 includes, when the pressure value is not greater than the dynamic threshold, determining if the pressure value is less than the negative component of the dynamic threshold (412). This determines if flow is in a negative direction. If so, negative polarity/multiplier (−1) may be assigned (414). The magnitude of the dynamic threshold may also be increased to the magnitude of the pressure value. That is, both the positive component and the negative component of the dynamic threshold may be increased to the magnitude of the pressure value. Process 400 also includes determining whether the dynamic threshold, as adjusted based on the current pressure value, is greater in magnitude than the threshold limit (416). If so, then the positive and negative components of the dynamic threshold may be set to the threshold limit (418).

Steps 422 and 424 of process 400 may be described as a threshold collapse phase. That is, steps 422 and 424 determine whether a current pressure value is lesser in magnitude than the past pressure values (e.g., reflected in the dynamic threshold) and adjust (decrease) the dynamic threshold accordingly. According to an exemplary embodiment, the dynamic threshold is decreased to twice the current pressure when the current pressure decreases to one-half or less than one-half immediate past pressure value(s) (e.g., as reflected in the dynamic threshold). Process 400 includes determining whether two times the absolute value of the current pressure value is less than the dynamic threshold (422). That is, has the current pressure decreased by at least one-half of the dynamic threshold? If so, then the positive and negative components of the dynamic threshold are set to two times the absolute value of the current pressure value (424). In some embodiment, process 400 may additionally include determining whether two times the absolute value of the current pressure is greater than a minimum value. The minimum value may be an offset. If two times the absolute value of the current pressure is greater than the minimum value, then the dynamic threshold may be set as in step 424. If the two times the absolute value of the current pressure is not greater than the minimum value, then the dynamic threshold may be set to the minimum value.

Process 400 includes calculating a final pressure value (426). The final pressure value may be described as a pressure variable. According to an exemplary embodiment, the final pressure value is the current pressure value multiplied by the polarity/multiplier from step 402, step 410, or step 414. In some embodiments, an offset may be added to or subtracted from the current pressure value. The offset may be an internal offset value associated with the sensor that may be positive or negative. The sum or difference may then be multiplied by the polarity/multiplier to compute the final pressure value. Other mathematical functions including the current pressure value and polarity may be used to calculate the final pressure value. The calculation is "final" in that it is carried out after a polarity has been determined. Process 400 continues with next current pressure value (406). At the end of each iteration, a different final value may be calculated.

Figure 5A:
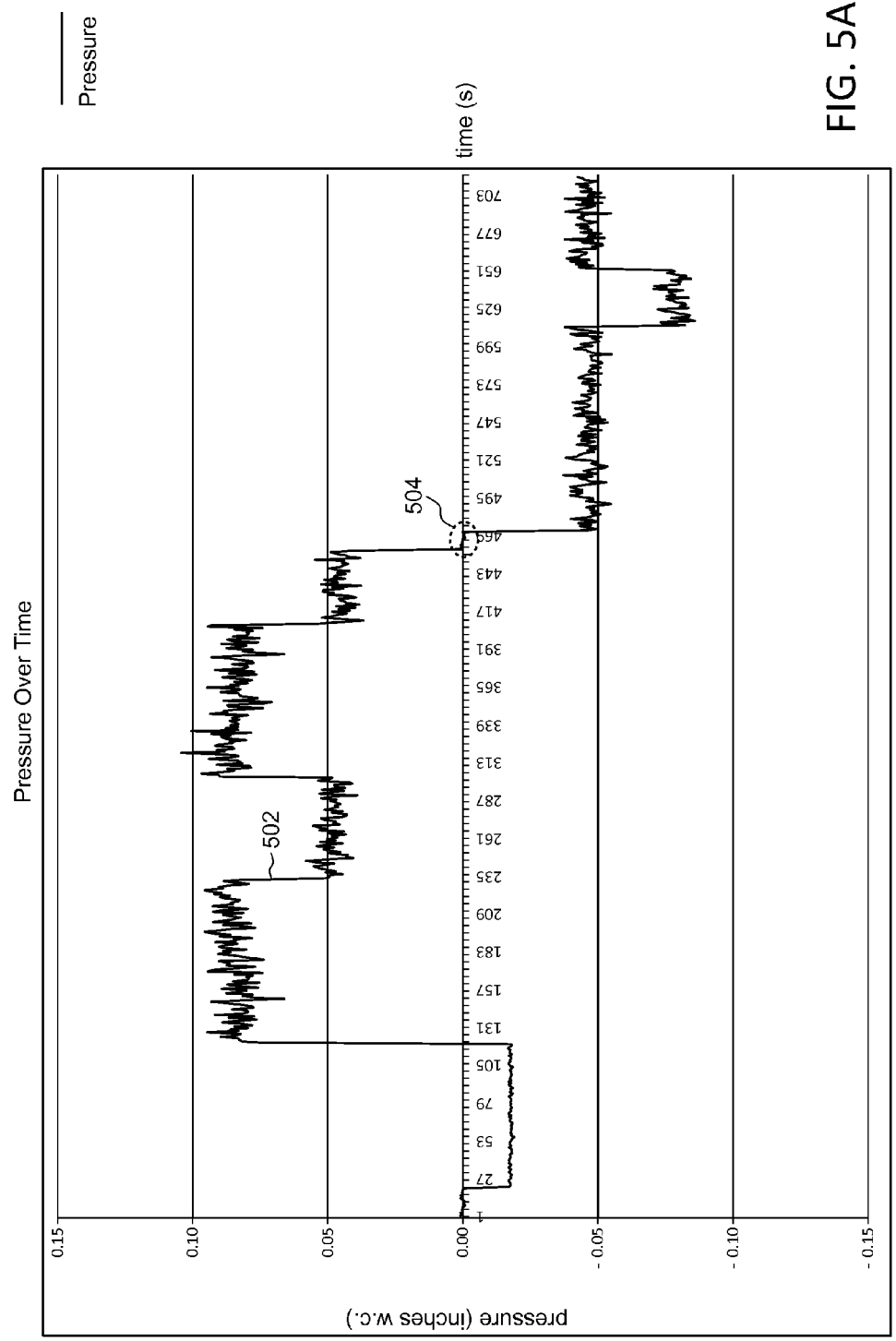
FIG. 5A is a plot of pressure over time at a bidirectional sensor, according to an exemplary embodiment.
Figure 5B:
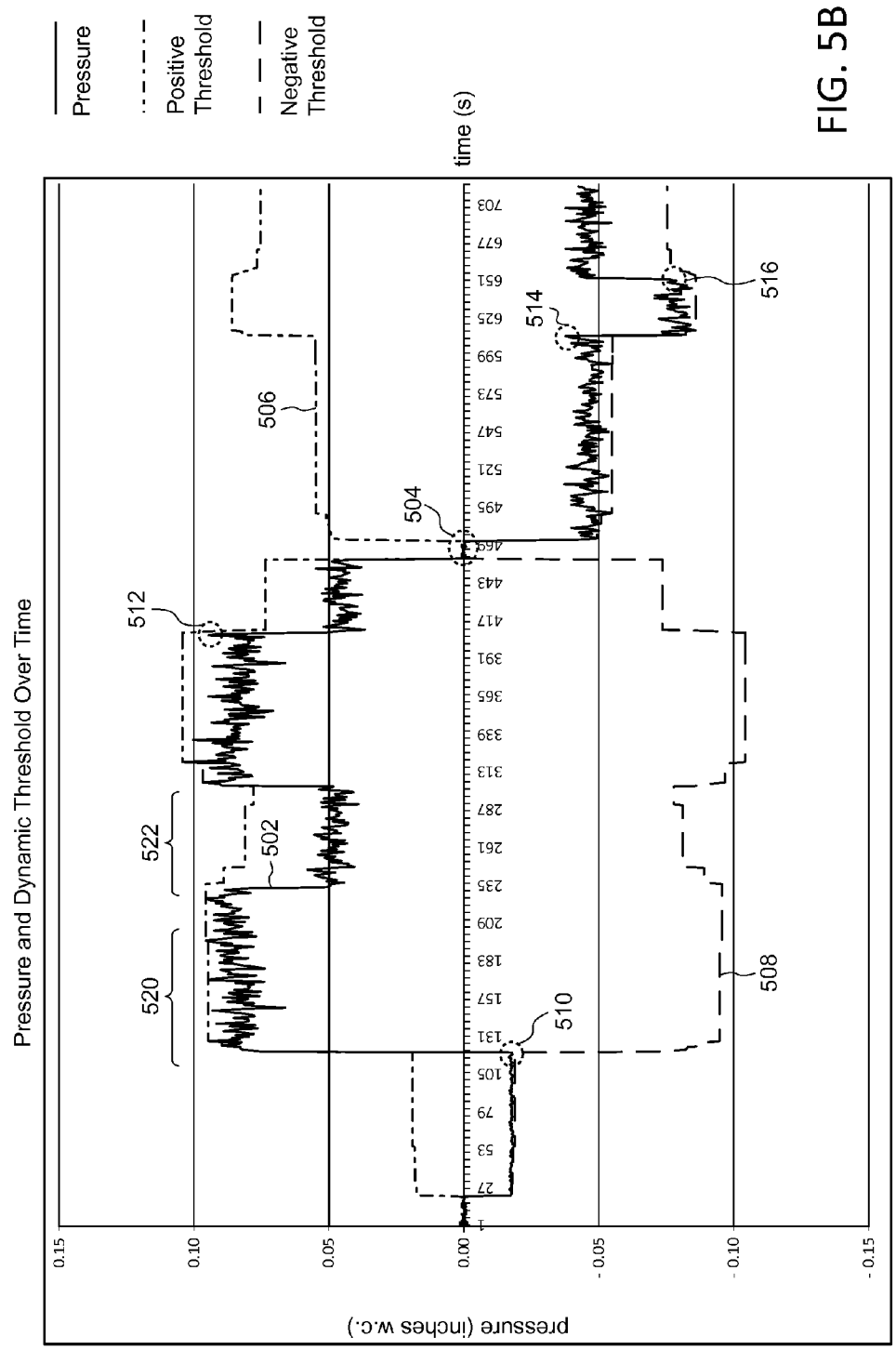
FIG. 5B is a plot of pressure relative to the dynamic threshold used by systems and methods described herein, according to varying exemplary embodiments.

Referring to FIGS. 5A-5B, plots of pressure (and, in FIG. 5B, the dynamic threshold) over time are shown, according to exemplary embodiments. The plots may be generated based on the calculations described in FIGS. 2-4 and implemented on controller 110. The plots of FIGS. 5A-5B may be output to at least one memory device, a user device, and/or another device on the building management system. The output may be a graphical user interface (e.g., on a client device, on a mobile device, generated by a web server, etc.). For example, the plot of FIG. 5A may be output to monitoring and reporting applications 140 via GUI engine 136 (FIG. 1). Depending on the embodiment, the plots include more data or less data compared to the data shown in FIGS. 5A-5B. In some embodiments, a user may be able, via a user interface, to choose what data should be visible. A user may also be able to add data not shown in FIGS. 5A-5B (e.g., a static pressure). In other embodiments, the processes described herein will operate without displaying a graphical representation of pressure and dynamic threshold over time.

The plots of FIGS. 5A-5B include an x-axis representing time and a y-axis representing pressure. In various embodiments, different units for time and pressure may be used. FIGS. 5A-5B include pressure 502, shown in a solid line. FIG. 5B includes the positive component 506 of the dynamic threshold in a dot-dash line. FIG. 5B also includes the negative component 508 of the dynamic threshold in a dash line.

As reflected in FIG. 5A, pressure 502 during an initialization period (e.g., 27 seconds to approximately 120 seconds) is nominally negative. During the period, the pressure may be oscillating between positive and negative and may not be truly indicative of a direction of air flow. Pressure 502 increases at approximately 120 seconds and generally remains positive until approximately 450 seconds. Between 120 seconds and 450 seconds, the magnitude of the pressure 502 shifts, but the values are positive. At approximately 450 seconds, a transition 504 occurs. After transition 504, pressure 520 is negative, with varying magnitudes. Transition 504 suggests a switch in the air flow direction, caused by, e.g., reversal of the airflow tubes connected to the pressure sensor.

FIG. 5B includes pressure 502 from FIG. 5A. FIG. 5B also includes the corresponding dynamic thresholds 506, 508. As reflected in FIG. 5B, the magnitudes of the positive component 506 and the negative component 508 are equal in magnitude and opposite in sign. That is, the dynamic threshold 506, 508 is a mirror image across y=0. The magnitudes of dynamic threshold 506, 508 are also shown to be greater than or equal to immediate past pressure values(s). That is, as pressure value 502 increases or decreases in magnitude, the dynamic threshold 506, 508 expands or collapses, respectively, in response. For example, at points 510, 514, the magnitude of the air pressure increases, and the dynamic threshold is shown to expand. Range 520 shows that as magnitude of the pressure reaches a new local maximum, the dynamic threshold also increases to at least the value of the local maximum. At points 512, 516, the magnitude of the air pressure decreases and the dynamic threshold is shown to collapse. According to an exemplary embodiment, the pressure 502 decreases by at least one-half its previous value at points 512, 516. The magnitude of the dynamic threshold changes, in this embodiment, to twice the value of the pressure. Range 522 shows that as magnitude of the pressure decreases, the dynamic threshold also decreases.

Controller 110 (FIG. 1) may be configured to detect a change in flow direction when the magnitude of the flow exceeds the dynamic threshold in the opposite direction. This is shown at point 510. At or near point 510, the pressure changes from approximately −0.02 inches w.c. to +0.08 inches w.c. The positive component 506 is approximately 0.02 inches w.c. at point 510. When the pressure changes from −0.02 inches w.c. to +0.08, it exceeds the dynamic threshold in the opposite direction. Thus, controller 110 may determine that a switch in air flow occurred at or near point 510. Note that point 510 may be the special case of the HVAC system, controller 110, or pressure sensor 102 initializing. Controller 110 may also determine that a change in flow direction occurred at or near transition 504. Pressure 502 changes from nearly zero to approximately −0.05 inches w.c. The dynamic threshold near transition 504 is also nearly zero. The change in pressure to −0.05 exceeds the negative dynamic threshold. Thus, a change in flow direction is detected.

The discussion herein described one embodiment for determining a direction of airflow. Other embodiments may be utilized. For the example, the final value may be calculated using:

Final_value=absolute(raw_dpt−raw_offset).

Raw_dpt may describe the raw value from the pressure sensor, which may be positive or negative. Raw_offset may describe an internal offset of the sensor, which may also be positive or negative. One or more embodiments may advantageously determine the direction of airflow without knowledge of the direction that the tubes are connected to the pressure sensor. One or more embodiments may also advantageously output in a positive pressure value, which may be used in control algorithms for one or more building management components. One or more embodiments may also correct a signal (indicative of the pressure) for a reversed hose polarity relative to the bidirectional sensor. That is, airflow in a negative direction (i.e., a direction because of reversed hose polarity) may be identified and corrected (e.g., by taking the absolute value or applying a polarity multiplier).

While the discussion herein relates to the pressure of air in an HVAC system, the methods and systems described may be applied to other liquids and gases. For example, the direction of water flow in a water system may be automatically determined using a bidirectional pressure sensor and the systems and methods described herein.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any processes or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and computer-executable instructions on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machine to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating, ventilation, or air conditioning (HVAC) system with automated flow direction detection, the HVAC system comprising:
   one or more hoses configured to provide airflow from HVAC equipment;
   a bidirectional pressure sensor coupled to the hoses; and
   a controller coupled to the bidirectional pressure sensor, wherein the controller is configured to:
      generate a dynamic threshold based on one or more past pressure values measured by the bidirectional pressure sensor;
      receive a signal from the bidirectional pressure sensor, the signal comprising a current pressure value measured by the same bidirectional pressure sensor;
      determine a direction of the airflow relative to the bidirectional pressure sensor by comparing the current pressure value to the dynamic threshold, wherein the controller assigns a first flow direction to the airflow in response to a determination that the current pressure value is greater than the dynamic threshold, and assigns a second flow direction to the airflow in response to a determination that the current pressure value is less than the dynamic threshold;
      correct the signal for a reversed hose polarity relative to the bidirectional pressure sensor based on the direction of the airflow; and
      perform a control activity using the corrected signal.

2. The HVAC system of claim 1, wherein the bidirectional pressure sensor is configured to measure pressure values over time and provide a plurality of pressure values to the controller.

3. The HVAC system of claim 1, wherein the past pressure values comprise multiple past pressure values, wherein the controller is configured to:
   calculate a range of the past pressure values measured by the bidirectional pressure sensor;
   compare the current pressure value measured by the bidirectional pressure sensor to the range of past pressure values; and
   determine the direction of the airflow based on the current pressure value relative to the range of past pressure values.

4. The HVAC system of claim 3, wherein the controller is configured to:
   assign the first flow direction to the airflow in response to a determination that the current pressure value is greater than the range of past pressure values; and assign the second flow direction to the airflow in response to a determination that the current pressure value is less than the range of past pressure values.

5. The HVAC system of claim 1, wherein the past pressure values comprise multiple past pressure values, wherein the controller is configured to:
identify a threshold range for the past pressure values measured by the bidirectional pressure sensor, the threshold range spanning from a negative threshold value to a positive threshold value;
compare the current pressure value measured by the bidirectional pressure sensor to the threshold range; and
determine the direction of the airflow based on the current pressure value relative to the threshold range.

6. The HVAC system of claim 5, wherein the controller is configured to:
assign the first flow direction to the airflow in response to a determination that the current pressure value is greater than the positive threshold value; and
assign the second flow direction to the airflow in response to a determination that the current pressure value is less than the negative threshold value.

7. The HVAC system of claim 5, wherein the controller is configured to dynamically expand the threshold range by adjusting at least one of the negative threshold value and the positive threshold value in response to a determination that the current pressure value is outside the threshold range.

8. The HVAC system of claim 5, wherein the controller is configured to dynamically collapse the threshold range by adjusting at least one of the negative threshold value and the positive threshold value in response to a determination that the current pressure value is within a predetermined interval between the negative threshold value and the positive threshold value.

9. The HVAC system of claim 8, wherein the predetermined interval spans from a first interval value to a second interval value;
wherein the controller is configured to set the first interval value equal to a percentage of the negative threshold value and set the second interval value equal to a percentage of the positive threshold value.

10. The HVAC system of claim 8, wherein dynamically collapsing the threshold range comprises:
setting the positive threshold value equal to a positive multiple of the current pressure value; and
setting the negative threshold value equal to a negative multiple of the current pressure value.

11. A method for automatically detecting flow direction in a heating, ventilation, or air conditioning (HVAC) system, the method comprising:
providing airflow from HVAC equipment via one or more hoses;
measuring pressure values with a bidirectional pressure sensor coupled to the hoses, the pressure values comprising one or more past pressure values measured by the bidirectional pressure sensor and a current pressure value measured by the same bidirectional pressure sensor;
generating a dynamic threshold based on the one or more past pressure values measured by the bidirectional pressure sensor;
determining a direction of the airflow relative to the bidirectional pressure sensor by:
comparing the current pressure value to the dynamic threshold;
assigning a first flow direction to the airflow in response to a determination that the current pressure value is greater than the dynamic threshold; and
assigning a second flow direction to the airflow in response to a determination that the current pressure value is less than the dynamic threshold;
correcting the current pressure value for a reversed hose polarity relative to the bidirectional pressure sensor based on the direction of the airflow; and
performing a control activity using the corrected current pressure value.

12. The method of claim 11, wherein measuring the pressure values comprises measuring a plurality of pressure values over time;
the method further comprising providing the plurality of pressure values to a controller.

13. The method of claim 11, wherein the past pressure values comprise multiple past pressure values, the method further comprising:
calculating a range of the past pressure values measured by the bidirectional pressure sensor;
comparing the current pressure value measured by the bidirectional pressure sensor to the range of past pressure values; and
determining the direction of the airflow based on the current pressure value relative to the range of past pressure values.

14. The method of claim 13, further comprising:
assigning the first flow direction to the airflow in response to a determination that the current pressure value is greater than the range of past pressure values; and
assigning the second flow direction to the airflow in response to a determination that the current pressure value is less than the range of past pressure values.

15. The method of claim 11, wherein the past pressure values comprise multiple past pressure values, the method further comprising:
identifying a threshold range for the past pressure values measured by the bidirectional pressure sensor, the threshold range spanning from a negative threshold value to a positive threshold value;
comparing the current pressure value measured by the bidirectional pressure sensor to the threshold range; and
determining the direction of the airflow based on the current pressure value relative to the threshold range.

16. The method of claim 15, further comprising:
assigning the first flow direction to the airflow in response to a determination that the current pressure value is greater than the positive threshold value; and
assigning the second flow direction to the airflow in response to a determination that the current pressure value is less than the negative threshold value.

17. The method of claim 15, further comprising dynamically expanding the threshold range by adjusting at least one of the negative threshold value and the positive threshold value in response to a determination that the current pressure value is outside the threshold range.

18. The method of claim 15, further comprising dynamically collapsing the threshold range by adjusting at least one of the negative threshold value and the positive threshold value in response to a determination that the current pressure value is within a predetermined interval between the negative threshold value and the positive threshold value.

19. The method of claim 18, wherein the predetermined interval spans from a first interval value to a second interval value;

the method further comprising setting the first interval value equal to a percentage of the negative threshold value and setting the second interval value equal to a percentage of the positive threshold value.

20. The method of claim 18, wherein dynamically collapsing the threshold range comprises:
setting the positive threshold value equal to a positive multiple of the current pressure value; and
setting the negative threshold value equal to a negative multiple of the current pressure value.

* * * * *